United States Patent
Morita

(10) Patent No.: US 11,169,478 B2
(45) Date of Patent: Nov. 9, 2021

(54) IMAGE FORMING APPARATUS, IMAGE FORMING METHOD, AND NON-TRANSITORY RECORDING MEDIUM WHICH PERFORMS ADJUSTMENT OF IMAGE FORMATION BASED ON ADJUSTED SHEET SIZE

(71) Applicant: Konica Minolta, Inc., Tokyo (JP)

(72) Inventor: Keisuke Morita, Akishima (JP)

(73) Assignee: Konica Minolta, Inc., Tokyo (JP)

( * ) Notice: Subject to any disclaimer, the term of this patent is extended or adjusted under 35 U.S.C. 154(b) by 0 days.

(21) Appl. No.: 16/866,749

(22) Filed: May 5, 2020

(65) Prior Publication Data

US 2020/0356039 A1    Nov. 12, 2020

(30) Foreign Application Priority Data

May 10, 2019  (JP) .............................. JP2019-089584

(51) Int. Cl.
   *G03G 15/00*    (2006.01)
   *H04N 1/00*     (2006.01)

(52) U.S. Cl.
   CPC ..... *G03G 15/5095* (2013.01); *G03G 15/5062* (2013.01); *G03G 15/6573* (2013.01); *G03G 2215/0059* (2013.01); *G03G 2215/00734* (2013.01); *H04N 1/00002* (2013.01)

(58) Field of Classification Search
   CPC ........... G03G 15/5095; G03G 15/5029; G03G 15/5062; G03G 15/6573; G03G 2215/00421; G03G 2215/0059; G03G 2215/00734

USPC ............................................. 399/15, 45, 389
See application file for complete search history.

(56) References Cited

U.S. PATENT DOCUMENTS

| | | | | |
|---|---|---|---|---|
| 7,197,254 B2 * | 3/2007 | Tomita | ................... | G03G 15/50 399/15 |
| 2004/0190927 A1 * | 9/2004 | Tsukamoto | .......... | G03G 15/234 399/82 |
| 2009/0269091 A1 * | 10/2009 | Yuasa | ................... | G03G 15/238 399/45 |
| 2010/0225932 A1 * | 9/2010 | Kurose | ................ | G03G 15/234 358/1.1 |
| 2013/0155428 A1 * | 6/2013 | Mizuno | ................... | B41J 11/008 358/1.9 |

(Continued)

FOREIGN PATENT DOCUMENTS

| | | | | |
|---|---|---|---|---|
| JP | 61235859 A | * | 2/1986 | ......... G03G 15/6579 |
| JP | 03132673 A | * | 6/1991 | |
| JP | 2018-118393 | | 8/2018 | |

*Primary Examiner* — Robert B Beatty
(74) *Attorney, Agent, or Firm* — BakerHostetler

(57) ABSTRACT

An image forming apparatus may include: a sheet storage that may store a sheet; a first sheet sensor that may determine a sheet size of the sheet stored in the sheet storage; a feeder that may feed the sheet from the sheet storage to a transport path based on the sheet size determined by the first sheet sensor; an image former that may form an image on the sheet fed to the transport path; a second sheet sensor that may (i) be provided downstream of the image former on the transport path, (ii) read the sheet in the transport path, and (iii) adjust the sheet size of the sheet; and a hardware processor that may perform adjustment of image formation on the sheet based on the sheet size adjusted by the second sheet sensor.

20 Claims, 11 Drawing Sheets

(56) References Cited

U.S. PATENT DOCUMENTS

2014/0037299 A1\* 2/2014 Nakura ................ G03G 15/235
 399/16
2018/0164733 A1\* 6/2018 Morita ................ B41J 11/0005

\* cited by examiner

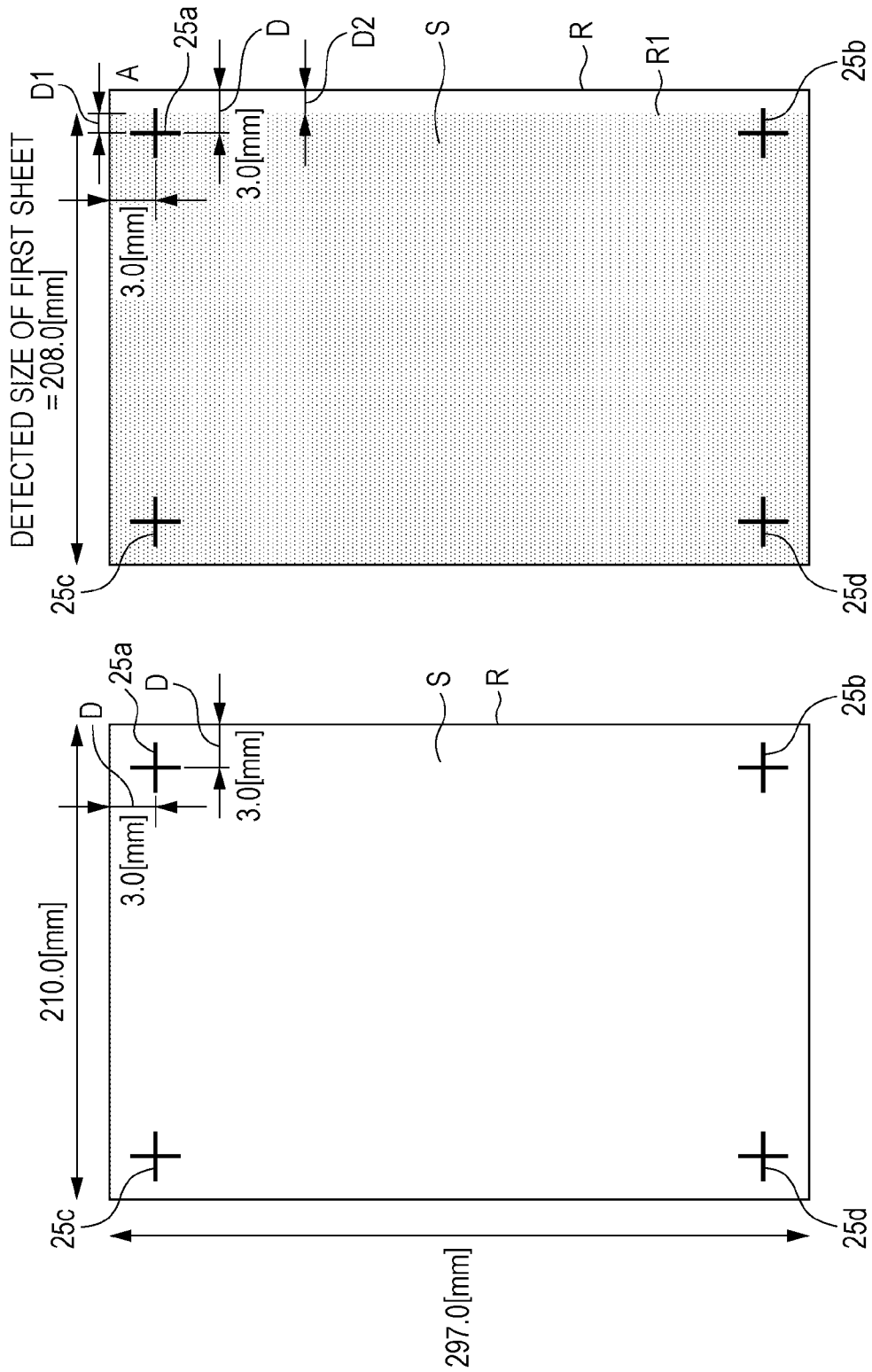

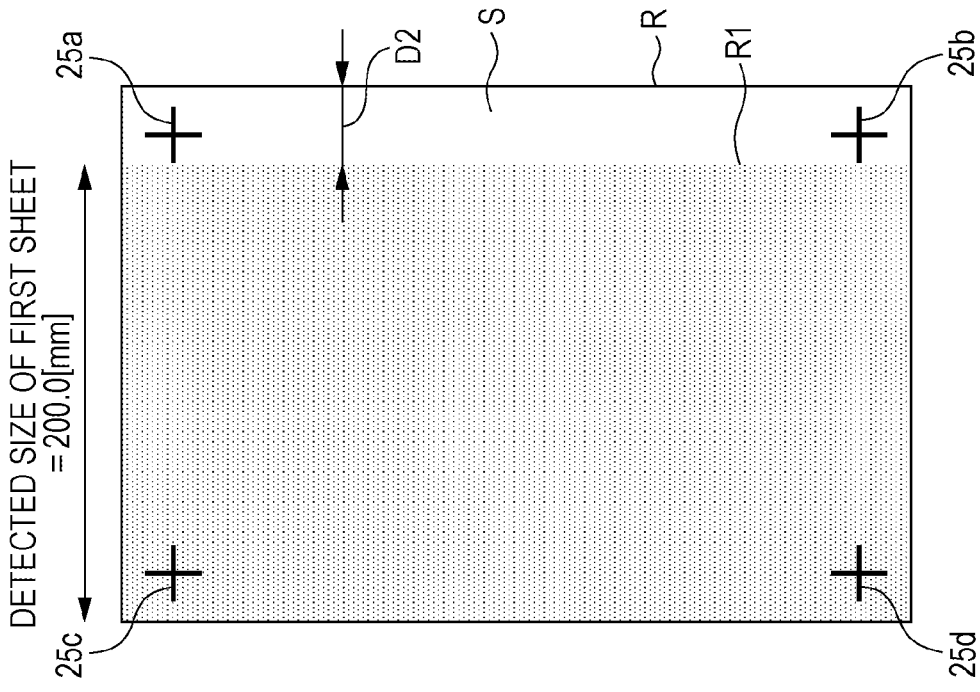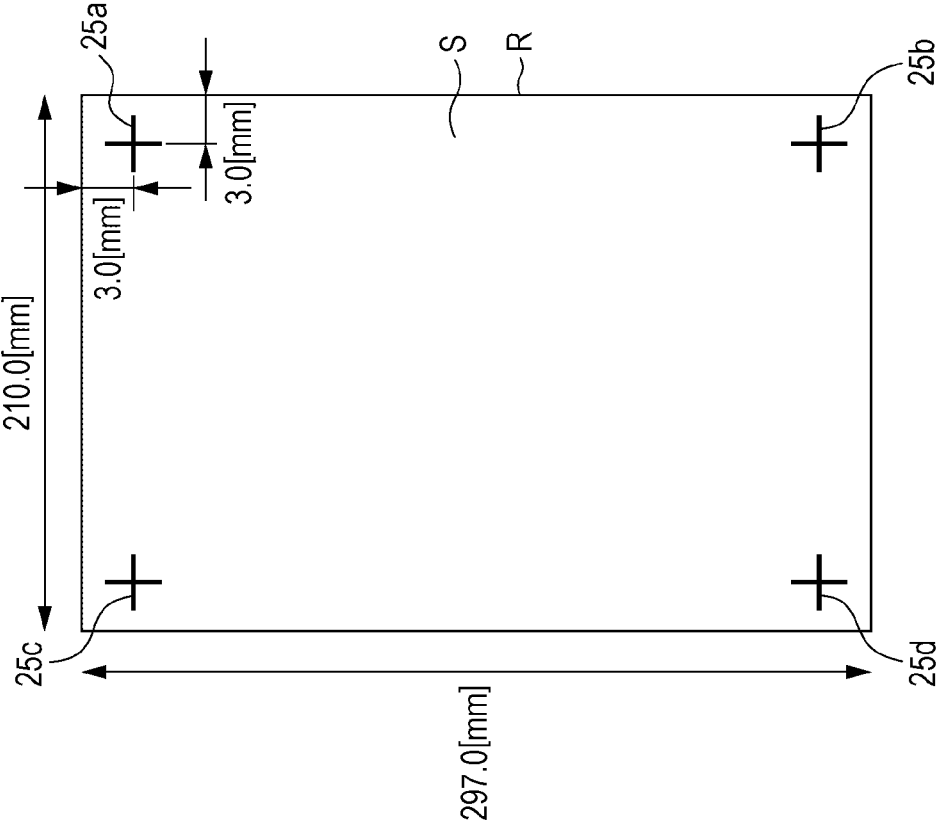

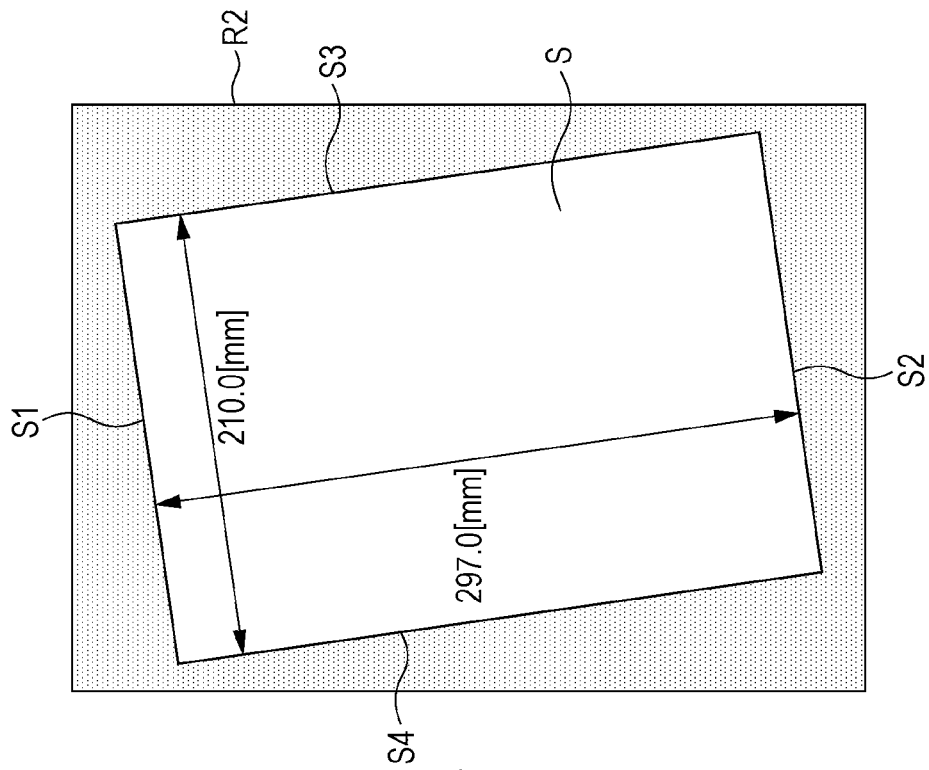
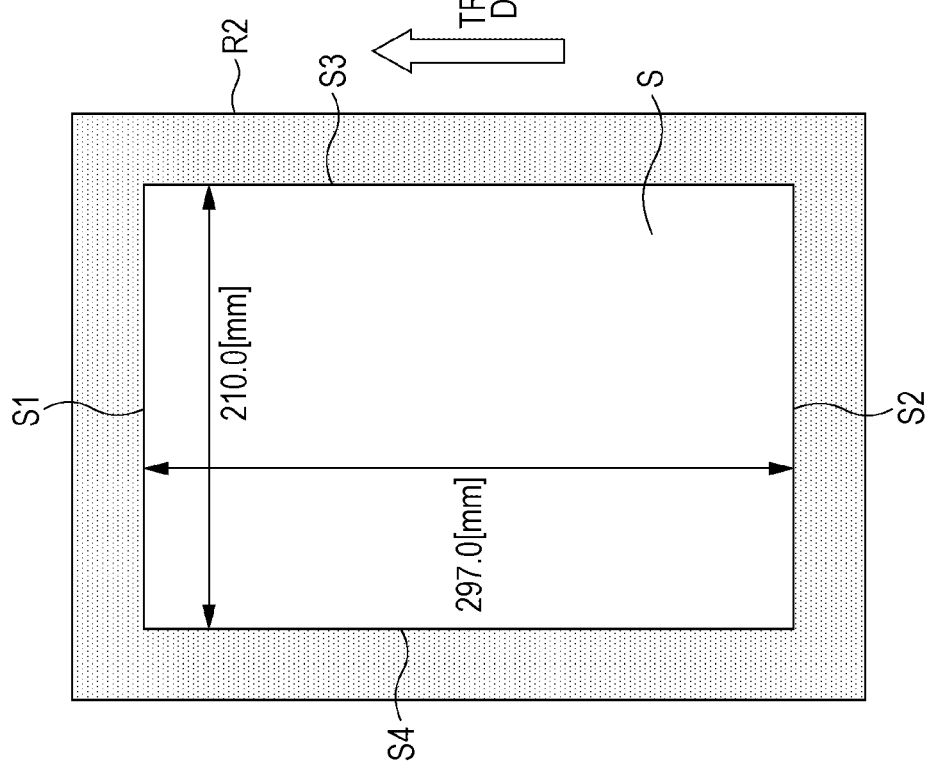

IMAGE FORMING APPARATUS, IMAGE FORMING METHOD, AND NON-TRANSITORY RECORDING MEDIUM WHICH PERFORMS ADJUSTMENT OF IMAGE FORMATION BASED ON ADJUSTED SHEET SIZE

CROSS-REFERENCE TO RELATED APPLICATION

This application claims priority to Japanese Patent Application No. 2019-089584, filed on May 10, 2019, which is incorporated herein by reference in its entirety.

BACKGROUND

Technological Field

The present disclosure relates to an image forming apparatus, an image forming method, and a program for performing image adjustment processing on the basis of a read result obtained by reading a recording medium with an image reader.

Description of the Related Art

It has been known to perform image adjustment processing such as adjustment of the positions of front and back sides of a sheet, adjustment of the position of image formation, and color adjustment by calculating a distance between an adjustment image (registration mark image) formed at a corner of a sheet read by an image reading device and an edge of the sheet on the basis of the sheet size read by a sensor of a feed tray or the sheet size set by a user (see, for example, JP 2018-118393 A).

However, if the sheet size read by the sensor of the feed tray or the sheet size set by the user is larger than the actual sheet size, the distance between the edge of the sheet and the registration mark image is calculated to be large, which results in a determination that an image is too small and false image adjustment processing that enlarges the image.

Moreover, if the sheet size read by the sensor of the feed tray or the sheet size set by the user is smaller than the actual sheet size, the distance between the edge of the sheet and the registration mark image is calculated to be small, which results in a determination that an image is too large and false image adjustment processing that shrinks the image.

SUMMARY

The present disclosure has been made in view of the problems in the related art above, and has an object of performing image adjustment processing with high accuracy by accurately detecting the size of a sheet.

To achieve the abovementioned object, according to an aspect of the present disclosure, an image forming apparatus reflecting one aspect of the present disclosure may comprise: a sheet storage that may store a sheet; a first sheet sensor that may determine a sheet size of the sheet stored in the sheet storage; a feeder that may feed the sheet from the sheet storage to a transport path on the basis of the sheet size determined by the first sheet sensor; an image former that may form an image on the sheet fed to the transport path; a second sheet sensor that may (i) be provided downstream of the image former on the transport path, (ii) read the sheet in the transport path, and (iii) settle, confirm, and/or adjust a previously detected value of the sheet size of the sheet; and a hardware processor that may perform adjustment of image formation on the sheet on the basis of the sheet size settled, confirmed, and/or adjusted by the second sheet sensor.

BRIEF DESCRIPTION OF THE DRAWINGS

The advantages and features provided by one or more embodiments of the disclosure will become more fully understood from the detailed description given hereinbelow and the appended drawings which are given by way of illustration only, and thus are not intended as a definition of the limits of the present disclosure:

FIGS. 4A and 4B are each an entire view of the sheet on which the adjustment image is formed, the view being used in the description of an embodiment of the present disclosure;

FIGS. 5A and 5B are each an entire view of the sheet on which the adjustment image is formed, the view being used in the description of an embodiment of the present disclosure;

FIGS. 6A and 6B are each a view illustrating a positional relationship between a read area of an image reading device and a sheet used in the description of an embodiment of the present disclosure;

DETAILED DESCRIPTION OF EMBODIMENTS

Figure 1:
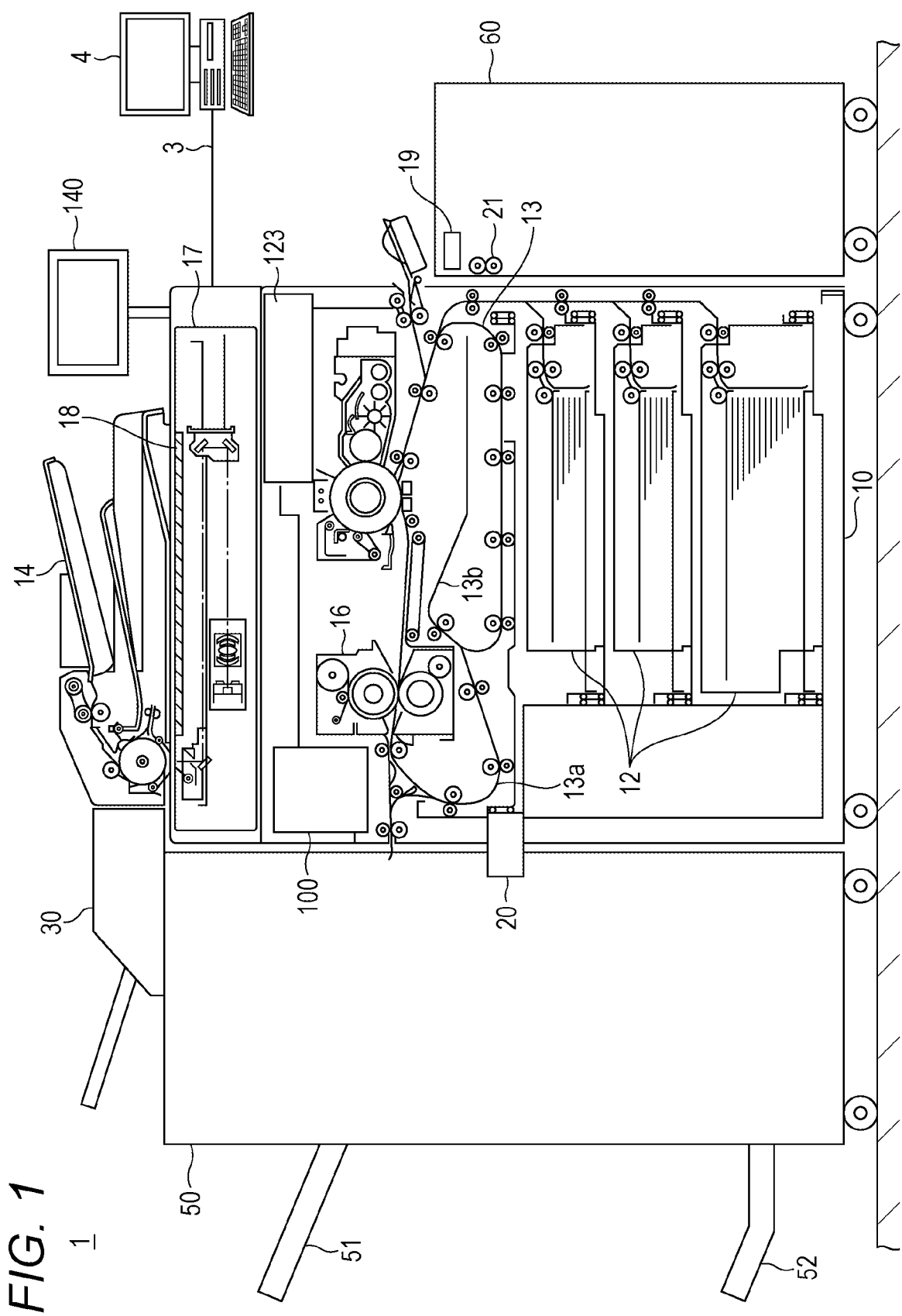
FIG. 1 is a diagram illustrating a mechanical configuration of an image forming apparatus according to an embodiment of the present disclosure.

Hereinafter, one or more embodiments of the present disclosure will be described with reference to the drawings. However, the scope of the disclosure is not limited to the disclosed embodiments. Note that in the present specification and drawings, components having substantially the same function or configuration are denoted by the same reference numerals, and redundant description will be omitted.

FIG. 1 is a diagram illustrating a mechanical configuration of an image forming apparatus 1 according to an embodiment of the present disclosure. As illustrated in FIG. 1, the image forming apparatus 1 has a configuration in which a sheet feeder 60, an apparatus body 10, and a post-processing device 50 are mechanically and electrically connected in this order from an upstream side of a direction of transport of a sheet. The devices can transport sheets and perform communication thereamong.

The sheet feeder 60 being a sheet storage includes a high-capacity feed tray (not shown) storing a large number of sheets, and feeds a sheet in the tray to a transport path 13 in the apparatus body 10 via a feed roller 21 as a feeder. Note that the sheet is not limited to paper, and a recording medium made of another material such as cloth or plastic may be used.

The sheet feeder 60 further includes a detection sensor 19 as a first sheet sensor that detects the size of the sheet fed from the tray.

The apparatus body 10 includes the transport path 13 in a housing, and the transport path 13 is connected to the sheet feeder 60 on an upstream side and connected to the post-processing device 50 on a downstream side. An image former 11 is included in the middle of the transport path 13. In a lower part of the housing of the apparatus body 10, a main body feeder 12 including a plurality of feed trays being the sheet storage is provided and feeds a sheet stored therein to the transport path 13. Normally, the feed trays of the main body feeder 12 each stores a different type of sheets.

The transport path 13 transports a sheet fed from the sheet feeder 60 or the main body feeder 12, and the image former 11 prints an image on the sheet. The image former 11 includes an LD, a charger, a photoreceptor for each color, a developing unit, an intermediate transfer belt, a secondary transfer unit, a fixing unit, and the like, and forms an image by electrophotography. That is, the image former 11 includes the photoreceptor for each color (such as cyan (C), magenta (M), yellow (Y), and black (K)), and the charger, the LD, and the developing unit (not shown) are provided around each of the photoreceptors. The image former 11 also includes the intermediate transfer belt, the secondary transfer unit, and the fixing unit. The intermediate transfer belt is one onto which an image on each of the photoreceptors is transferred, and the secondary transfer unit transfers the image on the intermediate transfer belt to the sheet. A fixing unit 16 is disposed on the transport path 13 downstream of the secondary transfer unit, and applies heat and pressure to the sheet to fix the image on the sheet. Note that although the present embodiment assumes a color printer, the present disclosure is not limited thereto but may include an image forming apparatus that can perform printing using only single color such as black and white printing.

In the transport path 13, a reverse transport path 13a is branched downstream of the image former 11. A reversing part 13b is provided in the middle of the reverse transport path 13a, and a downstream side of the reverse transport path 13a joins the transport path 13 at a position upstream of the image former 11. In the transport path 13, an image can be formed by the image former 11 on a front side of the sheet transported in the transport path 13. When an image is to be formed on a back side of the sheet, the sheet on which the image has been formed is sent to the reverse transport path 13a, and the reversing part 13b switches front and rear ends of the sheet to turn the sheet upside down and returns the sheet back to the downstream side of the reverse transport path 13a. After that, the sheet is returned to the transport path 13 upstream of the image former 11 so that an image is formed on the back side of the sheet.

The apparatus body 10 further includes an operation part 140 at the top of the housing. The operation part 140 allows for displaying information and inputting operations, and includes a display part and an operation part. Note that the display part and the operation part may be integrated by using an LCD with a touch panel. Moreover, a flow automatic document feeder (ADF) 14 is included at the top of the housing. The flow automatic document feeder (ADF) 14 automatically feeds a set document, which is read by a scanner 17. Note that the document can also be read on platen glass 18. The apparatus body 10 includes a controller 100 that controls the entire image forming apparatus 1. The controller 100 includes a CPU, a program operating on the CPU, a storage, and the like. Hardware of the controller 100 corresponds to a computer that executes the program according to the present disclosure.

The apparatus body 10 further includes an image reader 20. The image reader 20 as a second sheet sensor is provided downstream of the image former 11 and the fixing unit 16 on the transport path 13 while facing the transport path 13. The image reader 20 includes a CCD sensor, a CMOS sensor, or the like and optically reads an image on a sheet. Note that the image reader 20 according to the embodiment of the present disclosure includes a CCD line sensor that reads the whole sheet in one line. In the embodiment of the present disclosure, the length of the CCD line sensor along the CD direction corresponds to a sum of the width of the sheet transported and a predetermined area. That is, the read area of the image reader 20 according to the embodiment of the present disclosure corresponds to a range obtained by adding the predetermined area to the width of the sheet transported at minimum. Note that a range of the predetermined area can be set to an arbitrary range by a user via the operation part 140. Moreover, the read area of the image reader 20 is set to be larger than the read area of the detection sensor 19 that is the first sheet sensor.

A read result obtained by reading the sheet is transmitted to the controller 100. The controller 100 determines whether or not image adjustment processing is necessary on the basis of the read result obtained by the image reader 20, and causes an image adjustment controller 40 to execute the image adjustment processing as necessary.

The post-processing device 50 includes a discharge tray 51 and a discharge tray 52 as discharge destinations of a sheet that has been subjected to post-processing. The post-processing device 50 is adapted to perform predetermined processing such as stapling, punching, and saddle stitching, and may perform a plurality of post-processings.

At the top of the post-processing device 50, a PI tray 30 is provided to be able to feed a sheet to the transport path 13 downstream of the fixing unit 16 and upstream of the image reader 20. The PI tray 30 mainly feeds an adjustment sheet used when the image reader 20 detects the size of a front side of a sheet.

The apparatus body 10 is also connected to an external device 4 such as a PC. The external device 4 can communicate with the image forming apparatus 1 by connecting to a network 3, and can transmit job data and control the image forming apparatus 1. The external device 4 includes a communication unit (not shown) connected to the network 3. Note that the network between the external device 4 and the image forming apparatus 1 may be formed using a wireless network or WAN, and is not limited to a specific one.

Note that although the image forming apparatus 1 of the present embodiment includes the sheet feeder 60, the apparatus body 10, and the post-processing device 50, the present disclosure is not limited to the number and type of devices connected to the apparatus body 10 described herein. For example, the image forming apparatus may be one that does not include the post-processing device or one that includes a sheet discharge device.

Next, a functional configuration of the image forming apparatus 1 will be described with reference to a block diagram of FIG. 2.

Figure 2:
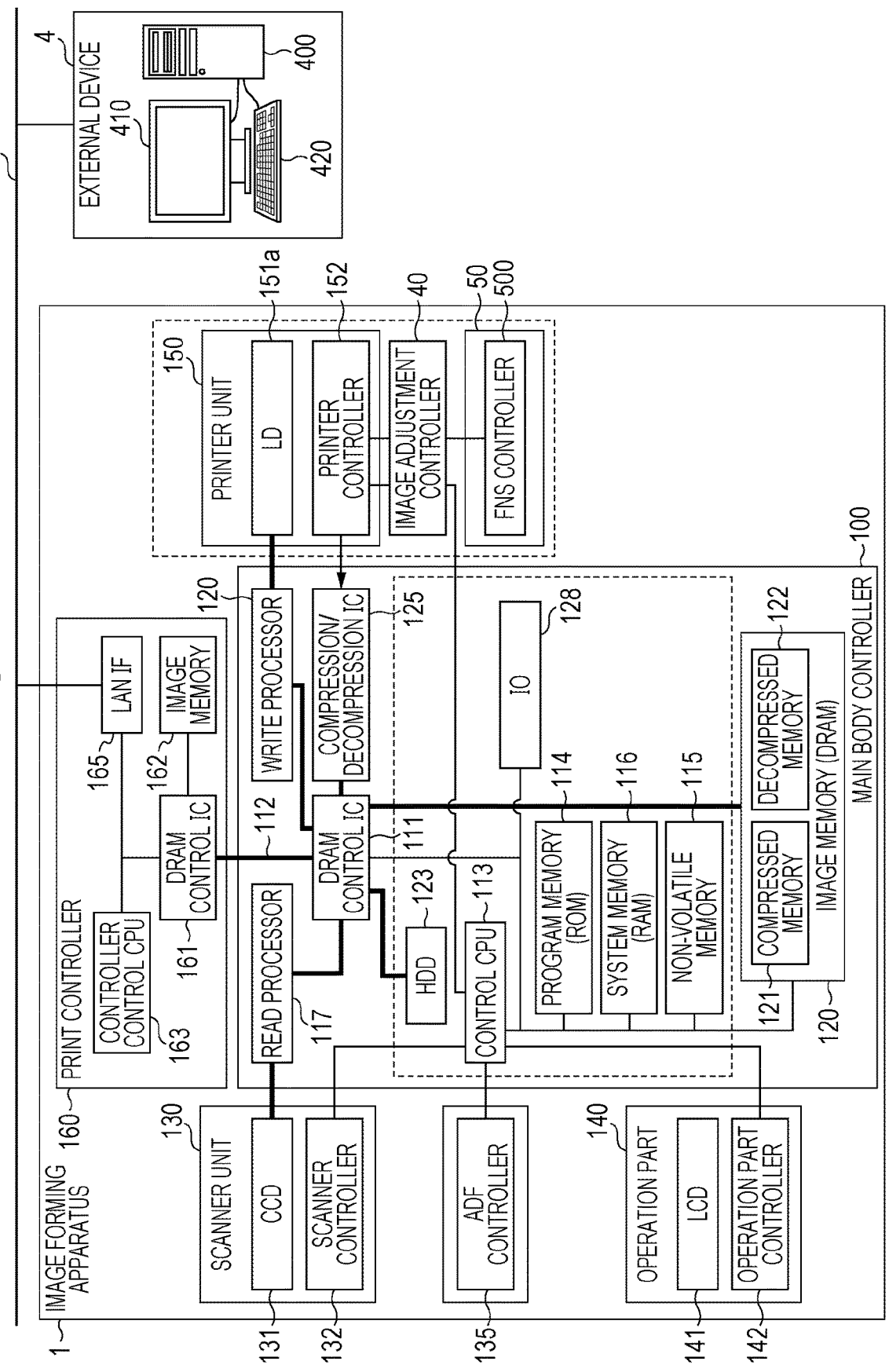
FIG. 2 is a block diagram illustrating an electrical configuration of the image forming apparatus according to an embodiment of the present disclosure.

FIG. 2 is a block diagram illustrating an electrical configuration of the image forming apparatus 1 according to the embodiment of the present disclosure. The image forming apparatus 1 includes a main body controller as the controller 100, a scanner unit 130, the operation part 140, a printer unit 150, and a print controller 160. The print controller 160 receives image data input from the external device 4 used as a terminal PC through the network 3 and processes the image data, or allows image data obtained by the scanner unit 130 to be transferred to the external device 4 or the like through the network 3.

The main body controller 100 includes a PCI bus 112 connected to the print controller 160 and to a DRAM control IC 111. The DRAM control IC 111 is connected to an image memory (DRAM) 120. The image memory (DRAM) 120 includes a compressed memory 121 that stores compressed image data and a decompressed memory 122 that temporarily stores uncompressed image (output image) data to be printed before image formation.

The DRAM control IC 111 is also connected to a hard disk (HDD) unit 123, which saves image data acquired by the scanner unit 130, image data acquired by the print controller 160, and the like. The image data acquired by the print controller 160 and the image data stored in the hard disk (HDD) unit 123 are transmitted to the DRAM control IC 111 via the PCI bus 112 with a print operation.

The main body controller 100 includes a control CPU 113, and the DRAM control IC 111 is connected to the control CPU 113. Also connected to the control CPU 113 are a program memory (ROM) 114, a system memory (RAM) 116, and a non-volatile memory 115. The program memory (ROM) 114 includes a ROM and stores a program for operating the control CPU 113 and the like. The system memory (RAM) 116 includes a RAM and is used as a work area or the like. The non-volatile memory 115 includes a flash memory or the like.

The non-volatile memory 115 stores initial setting information of the apparatus body 10, machine setting information such as process control parameters, and setting information such as post-processing settings, sheet size information data, tray setting information, a method of determining the necessity of image adjustment processing based on the read result by the image reader 20, and a condition for switching the discharge destination. The control CPU 113 can read non-volatile data in the non-volatile memory 115 and can also write desired data to the non-volatile memory 115.

The control CPU 113 executes a predetermined operation according to the program stored in the program memory (ROM) 114, and controls the operation of each of the sheet feeder 60, the apparatus body 10, the image reader 20, and the post-processing device 50 according to the machine setting information, print setting information, output setting, and the like. The program of the control CPU 113 includes the program according to the present disclosure. Note that the program may be stored in a mobile storage and distributed.

The control CPU 113 forms the controller 100 of the present disclosure together with the program memory (ROM) 114, the system memory (RAM) 116, the non-volatile memory 115, and the like, thereby being able to control execution of a job, the method of determining the necessity of image adjustment processing, switching of the discharge destination, output of a marker sheet, stopping of a job, and the like. The control CPU can also determine whether or not a sheet used for a print job is a sheet to be used first among the sheets set in the feed tray. The control CPU 113 may control each unit on the basis of output setting of a job or operation designation input through the operation part 140 or an external operation part of the external device 4.

The scanner unit 130 includes a CCD 131 that performs optical reading and a scanner controller 132 that controls the entire scanner unit 130. The scanner controller 132 is connected to the control CPU 113 so as to be able to perform serial communication therewith. The CCD 131 is connected to a read processor 117, which is controllably connected to the DRAM control IC 111.

The read processor 117 processes image data read by the CCD 131. The read processor 117 performs various processings such as analog signal processing, analog to digital (A/D) conversion processing, shading processing, and the like on an analog image signal input from the CCD 131, thereby generating digital image data and outputting it to a compression/decompression IC 125. Moreover, an ADF controller 135 is controllably connected to the control CPU 113 so that the flow automatic document feeder (ADF) 14 is controlled by the ADF controller 135. The scanner unit 130 reads an image of a document placed on the platen glass 18 at the top of the apparatus body 10 or a document automatically transported by the flow automatic document feeder (ADF) 14.

The read processor 117 according to the embodiment of the present disclosure also processes the image data read by the image reader 20.

The operation part 140 includes an LCD 141 with a touch panel and an operation part controller 142 that controls the entire operation part, and serves as both the operation part and the display part. The operation part controller 142 is connected to the control CPU 113 so as to be able to perform serial communication therewith.

Under the control of the control CPU 113, the operation part 140 allows for input of machine settings such as output condition settings and operation control conditions of the apparatus body 10, input of settings of sheet information (size and paper type) for each feed tray, setting of whether or not to form an adjustment image, post-processing setting, and the like through the LCD 141.

The DRAM control IC 111 is connected to the compression/decompression IC 125 that can compress or decompress image data. According to an instruction from the control CPU 113, the DRAM control IC 111 controls compression processing of image data and decompression processing of compressed image data by the compression/decompression IC 125, and also controls input/output of image data to/from the image memory (DRAM) 120.

The DRAM control IC 111 is also connected to a write processor 126. The write processor 126 is connected to the image former 11 including an LD 151a of the printer unit 150 and the like, and generates write data used for the operation of the LD 151a on the basis of image data. Note that the image data also includes data of an adjustment image (registration mark image) used to determine whether or not image adjustment processing is necessary.

The printer unit 150 includes a printer controller 152, which is connected to the control CPU 113 so as to be able to perform serial communication therewith. The printer controller 152 operates according to a control command from the control CPU 113 to perform control on the entire printer unit 150 (switching of the feed tray, image formation, sheet transport, switching of the discharge destination, post-processing, and the like), thereby performing sheet transport, image formation, and the like. The printer controller 152 further controls the detection sensor 19 that detects the size of a sheet fed from each feed tray. The printer controller can also instruct the compression/decompression IC 125 to decompress compressed image data.

The image adjustment controller 40 is controllably connected to the printer controller 152 according to the embodiment of the present disclosure. The image adjustment controller 40 calculates a distance between an edge of a sheet and an adjustment image (registration mark) on the basis of the size of the sheet read by the image reader 20, compares the distance with a predetermined ideal distance value saved in the non-volatile memory 115 to calculate an image adjustment value required for image adjustment processing, and performs necessary image adjustment processing. Here, the ideal distance value refers to an ideal distance between the edge of the sheet and the registration mark in a state where an image is accurately formed on the sheet, the ideal distance being determined according to the size of the sheet.

The image adjustment controller 40 also calculates a difference between the size of the sheet detected by the first sheet sensor 19 and the size of the sheet read by the image reader 20, and updates the ideal distance value saved in the non-volatile memory 115. Moreover, the image adjustment controller 40 compares the updated ideal distance value with the size of the sheet detected by the first sheet sensor 19 to calculate an image adjustment value required for image adjustment processing, and performs necessary image adjustment processing.

An FNS controller 500 of the post-processing device 50 is controllably connected to the printer controller 152. The printer controller 152 can issue a post-processing instruction to the FNS controller 500 on the basis of a command from the control CPU 113, and can also acquire state information of the post-processing device 50 from the FNS controller 500. The FNS controller 500 can control the entire post-processing device 50 and controls switching of the transport path in the post-processing device and post-processing in a post-processing unit 54. The FNS controller 500 can include a CPU, a program causing the CPU to operate, and the like.

A DRAM control IC 161 of the print controller 160 is connected to the PCI bus 112. When the apparatus body 10 is used as a network printer or a network scanner, the print controller 160 causes the apparatus body 10 to receive image data or the like from the external device 4 or the like connected to the network 3, or causes image data acquired by the scanner unit 130 to be transmitted to the external device 4 or the like connected to the network 3.

In the print controller 160, an image memory 162 including a DRAM or the like is connected to the DRAM control IC 161. Also in the print controller 160, the DRAM control IC 161, a controller control CPU 163 that controls the entire print controller 160, and a LAN interface 165 are connected to a common bus. The LAN interface 165 is connected to the network 3.

Moreover, an IO 128 is connected to the control CPU 113. The IO 128 can exchange signals with various sensors and the like inside and outside the image forming apparatus 1 and can, for example, transmit a control signal to the image reader 20 and acquire an image reading result from the image reader 20.

The external device 4 connected to the image forming apparatus 1 includes an external controller 400 that controls the entire external device 4, an operation screen 410, and an external operation part 420. The external controller 400 includes a CPU and a program that runs on the CPU. The external device 4 may control the image forming apparatus 1, in which case the external controller 400 functions as the controller according to the present disclosure, and hardware of the external controller 400 corresponds to a computer that executes the program according to the present disclosure. Moreover, the operation screen 410 and the external operation part 420 may be provided in a way that the operation part and the display part are integrated by an LCD with a touch panel or the like.

Next, a basic operation of the image forming apparatus 1 will be described. A procedure for accumulating image data in the image forming apparatus 1 will be described first. There will be described first a case in which the image forming apparatus 1 reads an image with the scanner unit 130 and generates image data. First, the scanner unit 130 optically reads an image from a document using the CCD 131. At this time, the control CPU 113 issues a command to the scanner controller 132, and the scanner controller 132 controls the operation of the CCD 131. The document may be read while being fed by the flow automatic document feeder (ADF) 14 or placed on the platen glass. The control CPU 113 is operated by a program, and issues the command to the scanner unit 130 on the basis of an operation by the operation part 140.

The image read by the CCD 131 is subjected to data processing in the read processor 117, then the image data having been subjected to the data processing is sent to the compression/decompression IC 125 via the DRAM control IC 111 and compressed by a predetermined method. The compressed data is stored in the compressed memory 121 via the DRAM control IC 111. When the data is to be stored in the HDD 123, the data temporarily stored in the compressed memory 121 is sent to the HDD 123 via the DRAM control IC 111. Note that in the embodiment of the present disclosure, an image read by the image reader 20 is processed in a similar procedure.

In addition, image data can be input to the image forming apparatus 1 via the network 3. Examples of the image data include data generated by an application program or the like of the external device 4 and data generated by another image forming apparatus. Such data is received by the print controller 160 via the network 3 and the LAN interface 165, and is temporarily stored in the image memory 162 by the DRAM control IC 161. The data stored in the image memory 162 is transferred to the DRAM control IC 111 via the PCI bus 112 and is temporarily stored in the decompressed memory 122. The data stored in the decompressed memory 122 is sent to the compression/decompression IC 125 via the DRAM control IC 111, subjected to compression processing, and stored in the compressed memory 121 via the DRAM control IC 111. When the data is to be stored in the HDD 123, the data temporarily stored in the compressed memory 121 is sent to the HDD 123 via the DRAM control IC 111.

Next, when an image is output by the image forming apparatus 1, the data stored in the HDD 123 is temporarily stored in the compressed memory 121 via the DRAM control IC 111. The data stored in the compressed memory 121 is sent to the compression/decompression IC 125 via the DRAM control IC 111 to be decompressed. The decompressed data is sent to the write processor 126 via the DRAM control IC 111, so that write data is generated and written to the photoreceptors in the LD 151a.

In the printer unit 150, the printer controller 152 having received a command from the control CPU 113 performs control on each of the main body feeder 12, the sheet feeder 60, the transport path 13, and the like. The printer unit 150 performs image formation, transfer to a sheet, fixing, transport to the post-processing device 50 through the transport path, post-processing in the post-processing device 50, and the like in order, thereby performing print-out.

Moreover, in the apparatus body 10, the control CPU 113 can acquire an image reading result obtained by the image reader 20 through the IO 128. The controller 100 according to the embodiment of the present disclosure determines whether or not image adjustment processing on the sheet is necessary from the image reading result of an adjustment image (registration mark image) formed on an adjustment sheet read by the image reader 20, and causes the image adjustment controller 40 to execute the image adjustment processing as necessary.

Next, there will be described a case where the image adjustment processing is performed on the basis of the read result of the registration mark image read by the image reader 20.

Figure 3A:
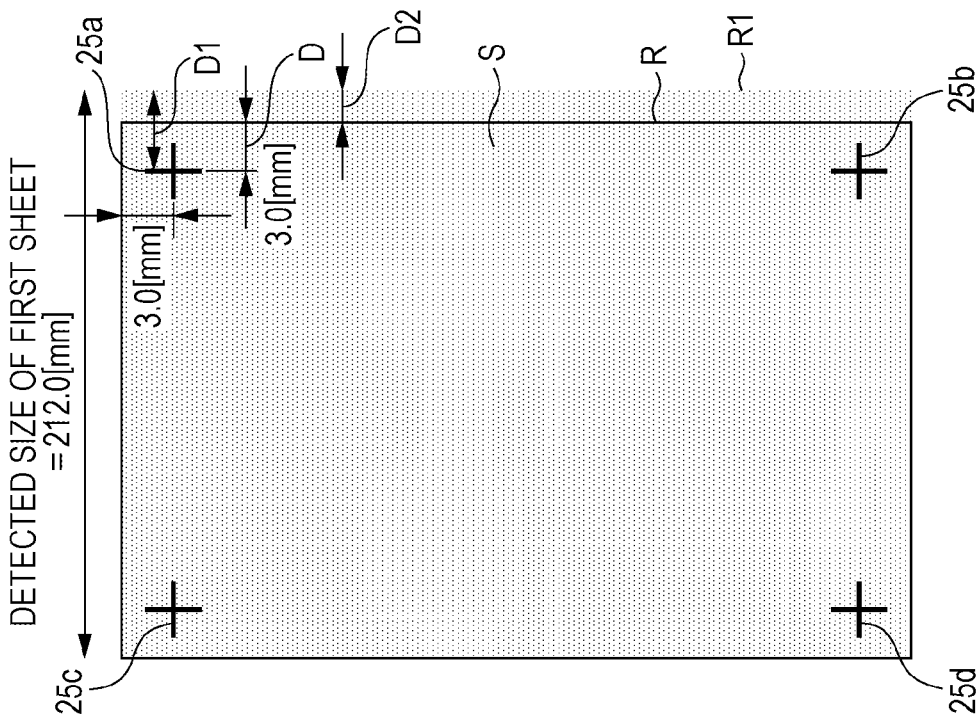
FIGS. 3A and 3B are each an entire view of a sheet on which an adjustment image is formed, the view being used in the description of an embodiment of the present disclosure.
Figure 3B:
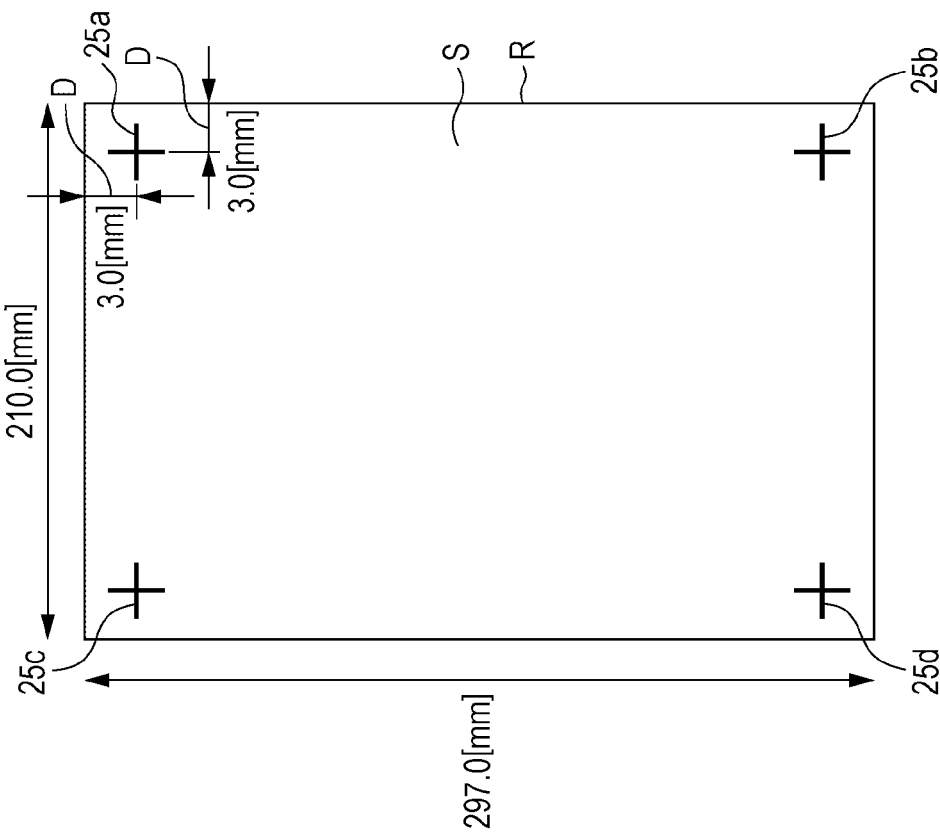

FIGS. 3A and 3B are each an entire view of a sheet on which the registration mark image as the adjustment image is formed.

The size of a sheet S used in the embodiment of the present disclosure is 297.0 mm in the vertical direction (FD direction) of the sheet and 210.00 mm in the horizontal direction (CD direction) of the sheet.

As illustrated in FIG. 3A, registration mark images 25 as the adjustment images are formed at four corners of the sheet S. For example, a registration mark image 25a at an upper right corner is formed at a position 3.0 mm away from a leading edge of the sheet in the FD direction and 3.0 mm away from a leading edge R of the sheet in the CD direction. A registration mark image 25b at a lower right corner is formed at a position 3.0 mm away from a trailing edge of the sheet in the FD direction and 3.0 mm away from the leading edge of the sheet in the CD direction. A registration mark image 25c at an upper left corner is formed at a position 3.0 mm away from the leading edge of the sheet in the FD direction and 3.0 mm away from a trailing edge of the sheet in the CD direction. A registration mark image 25d at a lower left corner is formed at a position 3.0 mm away from the trailing edge of the sheet in the FD direction and 3.0 mm away from the trailing edge of the sheet in the CD direction.

The following description will be made using the registration mark image 25a at the upper right corner. An ideal distance value D from the leading edge R of the sheet in the CD direction to the registration mark image 25 at this time is 3.0 mm.

FIG. 3B is an explanatory diagram in a case where the detection sensor 19 of the sheet feeder 60 as the first sheet sensor erroneously detects the size of the sheet in the CD direction as 212.0 mm. Note that the sheet size (read area) detected erroneously is shaded. In practice, there is a possibility that the size of the sheet is detected to be larger than the actual size as described above. Note that the similar applies to a case where a user erroneously inputs the sheet size as 212.0 mm via the operation part 140.

In this case, a distance value D1 between the registration mark image 25a read by the image reader 20 and a leading edge R1 of the sheet in the CD direction, which is erroneously detected, is 5.0 mm. Thus, when the size of the sheet is detected to be larger than the actual size, the distance value D1 from the leading edge R1 of the sheet in the CD direction to the registration mark image 25 as the read result of the image reader 20 is larger than the ideal distance value D. As a result, the controller 100 may determine that an image formed on the sheet is too small, and issue a false command to the image adjustment controller 40 such that the magnification is adjusted to enlarge the image.

FIGS. 4A and 4B are each an entire view of the sheet on which the registration mark image as the adjustment image is formed.

The size of the sheet used in the embodiment of the present disclosure is 297.0 mm in the FD direction of the sheet and 210.00 mm in the CD direction of the sheet.

As illustrated in FIG. 4A, the registration mark images 25 as the adjustment images are formed at the four corners of the sheet S. For example, a registration mark image 25a at an upper right corner is formed at a position 3.0 mm away from a leading edge of the sheet in the FD direction and 3.0 mm away from a leading edge R of the sheet in the CD direction. The ideal distance value D from the leading edge of the sheet in the CD direction to the registration mark image 25 at this time is 3.0 mm.

FIG. 4B is an explanatory diagram in a case where the detection sensor 19 of the sheet feeder 60 as the first sheet sensor erroneously detects the size of the sheet in the CD direction as 208.0 mm. Note that the sheet size (read area) detected erroneously is shaded.

In practice, there is a possibility that the size of the sheet is detected to be smaller than the actual size as described above. Note that the similar applies to a case where a user erroneously inputs the sheet size as 208.0 mm via the operation part 140.

In this case, the distance value D1 between the registration mark image 25a read by the image reader 20 and the leading edge R1 of the sheet in the CD direction, which is erroneously detected, is 1.0 mm. Thus, when the size of the sheet is detected to be smaller than the actual size, the distance value D1 from the leading edge R1 of the sheet in the CD direction to the registration mark image 25 as the read result of the image reader 20 is smaller than the ideal distance value D. As a result, the controller 100 may determine that an image formed on the sheet is too large, and issue a false command to the image adjustment controller 40 such that the magnification is adjusted to shrink the image.

FIGS. 5A and 5B are each an entire view of the sheet on which the registration mark image as the adjustment image is formed.

The size of the sheet used in the embodiment of the present disclosure is 297.0 mm in the FD direction of the sheet and 210.00 mm in the CD direction of the sheet.

As illustrated in FIG. 5A, the registration mark images 25 as the adjustment images are formed at the four corners of the sheet S. For example, a registration mark image 25a at an upper right corner is formed at a position 3.0 mm away from a leading edge of the sheet in the FD direction and 3.0 mm away from a leading edge R of the sheet in the CD direction. An ideal distance value D from the leading edge R of the sheet in the CD direction to the registration mark image 25 at this time is 3.0 mm.

FIG. 5B is an explanatory diagram of a case where, for example, a user erroneously sets the sheet size to 200.0 mm via the operation part 140. Note that the sheet size (read area) set erroneously is shaded.

In practice, there is a possibility that the size of the sheet is set to be extremely smaller than the actual size as described above.

Thus, when the size of the sheet is set to be extremely smaller than the actual size, the registration mark image 25 lies outside the read area so that the image reader 20 cannot read the registration mark images 25a and 25b on the side of the leading edge R1 of the sheet in the CD direction. Therefore, a read error occurs as the read result.

Next, an operation in which the size of a sheet is read by the image reader 20 according to the embodiment of the present disclosure will be described.

FIGS. 6A and 6B are each a view illustrating a positional relationship between a read area R2 of the image reading device and a sheet. Note that the read area R2 of the image reader 20 is shaded.

The size of the sheet used in the description of the embodiment of the present disclosure is 297.0 mm in the FD direction of the sheet and 210.00 mm in the CD direction of the sheet.

As illustrated in FIG. 6A, the read area R2 of the image reader 20 used in the embodiment of the present disclosure is set to a size obtained by adding a predetermined area in each of the FD direction of the sheet and the CD direction of the sheet to the size of the sheet transported. That is, the read area R2 is set to include a leading edge S1 and a trailing edge S2 of the sheet in the FD direction of the sheet, and a leading edge S3 and a trailing edge S4 of the sheet in the CD direction of the sheet. Therefore, the length in the CD direction of the CCD line sensor of the image reader 20 need only be equal to a length obtained by adding a predetermined area to the width of the sheet transported at minimum. The image reader 20 determines the size of the sheet by reading the length of the sheet in each of a main direction (FD direction) and a sub direction (CD direction) using the CCD line sensor.

FIG. 6B is a diagram illustrating a state in which the sheet is tilted with respect to the FD direction due to some cause while passing through the transport path 13.

Even when the sheet is tilted in such a manner, as illustrated in FIG. 6B, the read area R2 of the image reader 20 includes the leading edge S1 and the trailing edge S2 of the sheet in the FD direction of the sheet and the leading edge S3 and the trailing edge S4 of the sheet in the CD direction of the sheet. Therefore, the image reader 20 according to the embodiment of the present disclosure can accurately detect that the sheet S is tilted and that the length of the sheet is 297.0 mm in the FD direction of the sheet and 210.00 mm in the CD direction of the sheet.

Figure 7:
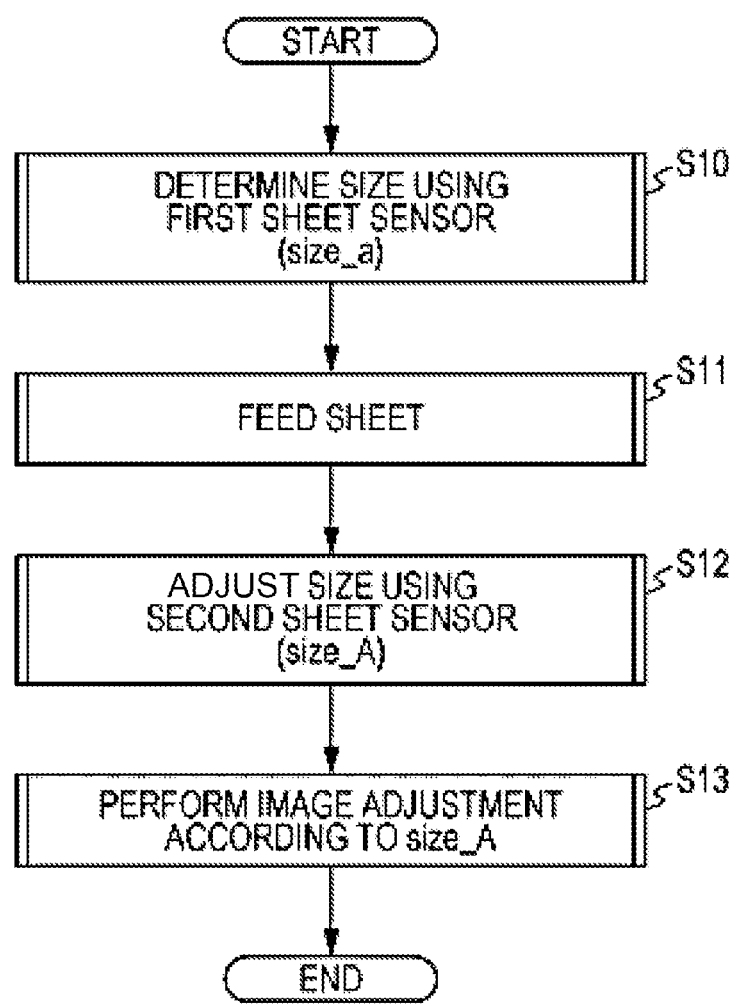
FIG. 7 is a flowchart when image adjustment processing is performed on the basis of a read result by an image reader according to an embodiment of the present disclosure.

FIG. 7 is a flowchart illustrating a flow when the image forming apparatus 1 according to the embodiment of the present disclosure performs image adjustment processing on the basis of a read result by the image reader 20.

First, the detection sensor 19 of the sheet feeder 60 as the first sheet sensor detects a sheet stored in the sheet feeder 60 and roughly determines the size (size a) of the sheet (step S10). Next, the sheet is fed to the transport path 13 by the feed roller 21 of the sheet feeder 60 (step S11).

Next, the image reader 20 as the second sheet sensor detects the sheet transported through the transport path 13 and determines the size (size A) of the sheet (step S12). Next, the controller 100 causes the image adjustment controller 40 to perform necessary image adjustment processing on the sheet on the basis of the size (size A) of the sheet determined by the image reader 20 (step S13). Note that the sheet size determined by the image reader 20 may be separated into a size on the front side and a size on the back size of the sheet to be saved in the non-volatile memory 115 as the storage.

The image forming apparatus 1 according to the embodiment of the present disclosure can perform the image adjustment processing on the basis of the accurate size (size A) of the sheet read by the image reader 20.

Figure 8:
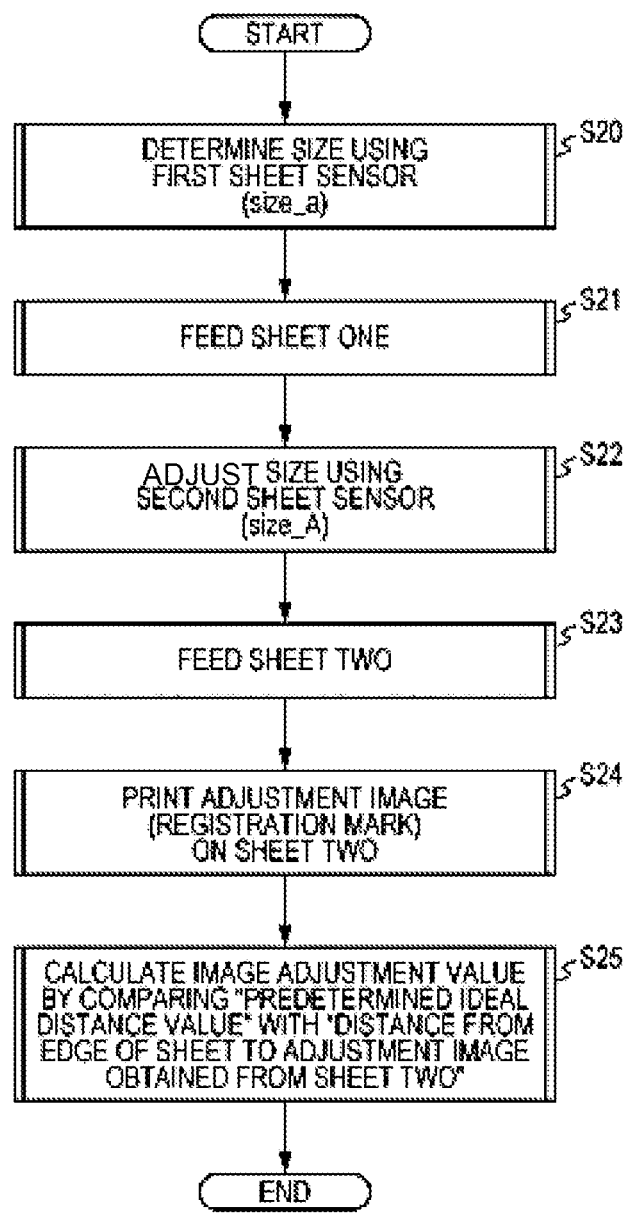
FIG. 8 is a flowchart when image adjustment processing is performed on the basis of a read result by the image reader according to an embodiment of the present disclosure.

FIG. 8 is a flowchart illustrating a flow when another image adjustment processing is performed on the basis of a read result of an adjustment image read by the image reader 20.

First, the detection sensor 19 of the sheet feeder 60 detects a sheet stored in the sheet feeder 60 and roughly determines the size (size a) of the sheet (step S20). Next, a sheet one as a first sheet is fed from the feed roller 21 of the sheet feeder 60 to the transport path 13 (step S21). Next, the image reader 20 as the second sheet sensor detects the sheet being transported and determines the size (size A) of the sheet (step S22). Note that in step S20, the size (size a) of the sheet may be determined on the basis of the storage capacity of the high-capacity feed tray of the sheet feeder 60.

Next, a sheet two as a second sheet is fed from the feed roller 21 of the sheet feeder 60 to the transport path 13 (step S23). The image former 11 then prints a registration mark image as an adjustment image on the sheet two (step S24).

Next, the image reader 20 reads the registration mark image printed on the sheet two, and the controller 100 calculates a distance value between an edge of the sheet and the registration mark image to calculate an image adjustment value by comparing the calculated distance value with a predetermined ideal distance value saved in the non-volatile memory 115 (step S25).

More specifically, in step S25 according to the embodiment of the present disclosure, if the distance value D1 (see FIGS. 3A and 3B) between the edge of the sheet and the registration mark image is calculated to be 3.1 mm, for example, the image adjustment value is calculated to be +1.0 mm by comparison between the calculated distance value and the ideal distance value of 3.0 mm. In this case, it is considered that an abnormality in which an image is formed small has occurred due to some cause in the middle of the transport path. Accordingly, the controller 100 causes the image adjustment controller 40 to perform magnification adjustment that enlarges the image as the image adjustment processing. Similarly, in step S25, if the distance value D1 (see FIGS. 4A and 4B) between the edge of the sheet and the registration mark image is calculated to be 2.9 mm, for example, the image adjustment value is calculated to be −1.0 mm by comparison between the calculated distance value and the ideal distance value of 3.0 mm. In this case, it is considered that an abnormality in which an image is formed large has occurred due to some cause in the middle of the transport path. Accordingly, the controller 100 causes the image adjustment controller 40 to perform magnification adjustment that shrinks the image as the image adjustment processing.

The image forming apparatus 1 according to the embodiment of the present disclosure calculates the distance value between the edge of the sheet and the registration mark image on the basis of the size (size A) of the sheet read by the image reader 20, thereby being able to perform the image adjustment processing with high accuracy using the accurate distance value.

Note that the distance value between the edge of the sheet and the registration mark image may be calculated at the same time the size of the sheet is detected by printing the registration mark image on the sheet one and analyzing one line of the CCD line sensor of the image reader 20.

Figure 9:
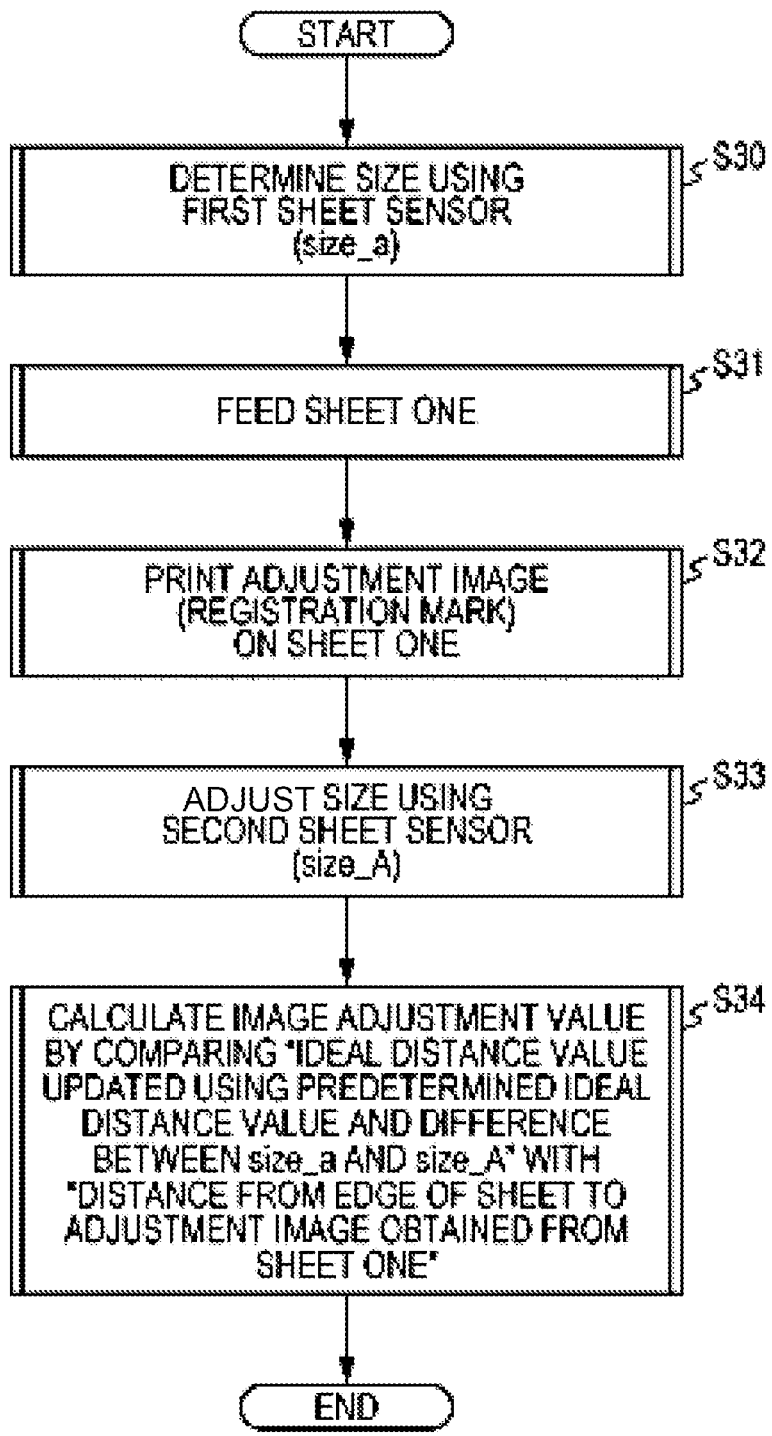
FIG. 9 is a flowchart when image adjustment processing is performed on the basis of a read result by the image reader according to an embodiment of the present disclosure.

FIG. 9 is a flowchart illustrating a flow when another image adjustment processing is performed on the basis of a read result of an adjustment image read by the image reader 20.

First, the detection sensor 19 of the sheet feeder 60 detects a sheet stored in the sheet feeder 60 and roughly determines the size (size a) of the sheet (step S30). Next, a sheet one is fed to the transport path 13 from the feed roller 21 of the sheet feeder 60 (step S31). The image former 11 then prints a registration mark image as an adjustment image on the sheet one being fed (step S32).

Next, the image reader 20 as the second sheet sensor determines the size (size A) of the sheet on the basis of the sheet one transported through the transport path 13 (step S33).

At this time, while the image reader 20 reads the size (size A) of the sheet, a difference between the size A and the size (size a) of the sheet determined by the detection sensor 19 is calculated. At the same time, the registration mark image printed on the sheet one is read, and a distance value between an edge of the sheet and the registration mark image is calculated.

Next, the controller 100 updates the ideal distance value saved in the non-volatile memory 115 on the basis of the difference in size between "size A" and "size a" of the sheet calculated in step S33, and calculates a new ideal distance value. Then, an image adjustment value is calculated by comparing the new ideal distance value with the distance value between the edge of the sheet and the registration mark image calculated in S33 (step S34).

Step S34 according to the embodiment of the present disclosure will be described more specifically with reference to the examples of FIGS. 4A and 4B. First in step S31, the detection sensor 19 determines the size (size a) of the sheet to be 208.0 mm. In step S33, the image reader 20 as the second sheet sensor determines the size (size A) of the sheet to be 210.0 mm, so that the difference between "size A" and "size a" is calculated to be 2.0 mm. Therefore, in step S34, the ideal distance value is updated to 3.0 mm−2.0 mm=1.0 mm to be the new ideal distance value.

For example, when the distance value D1 between the edge of the sheet and the registration mark image is calculated to be 1.5 mm in step S33, the image adjustment value is calculated to be +0.5 mm by comparison between the distance value D1 and the newly updated ideal distance value (1.0 mm). In this case, it is considered that an abnormality in which an image is formed small has occurred due to some cause in the middle of the transport path, so that the controller 100 causes the image adjustment controller 40 to perform magnification adjustment that enlarges the image as the image adjustment processing. Likewise, when the distance value D1 between the edge of the sheet and the registration mark image is calculated to be 0.5 mm in step S33, for example, the image adjustment value is calculated to be −0.5 mm by comparison between the distance value D1 and the newly updated ideal distance value (1.0 mm). In this case, it is considered that an abnormality in which an image is formed large has occurred due to some cause in the middle of the transport path, so that the controller 100 causes the image adjustment controller 40 to perform magnification adjustment that shrinks the image as the image adjustment processing.

The image forming apparatus 1 according to the embodiment of the present disclosure sets the new ideal distance value on the basis of the size (size A) of the sheet read by the image reader 20, thereby being able to perform the image adjustment processing without feeding the sheet twice.

Figure 10:
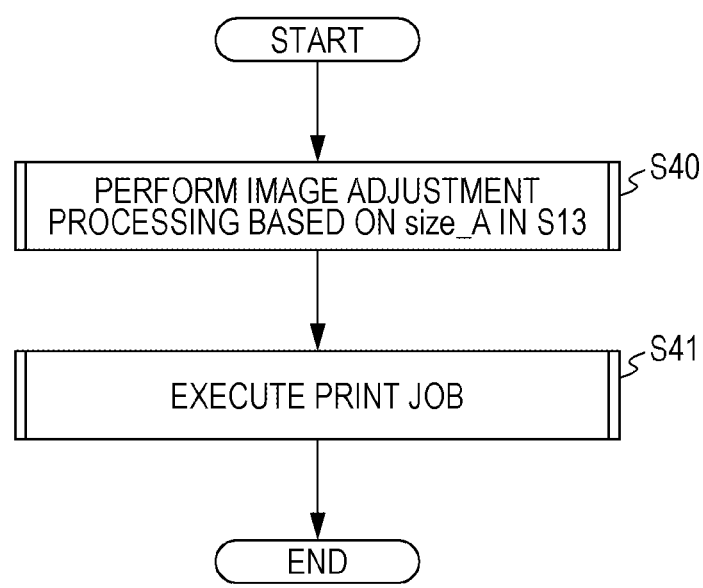
FIG. 10 is a flowchart when print processing is performed by the image forming apparatus according to an embodiment of the present disclosure.

FIG. 10 is a flowchart when print processing is performed by the image forming apparatus 1 according to the embodiment of the present disclosure.

First, before executing a print job, the controller 100 causes the image adjustment controller 40 to perform necessary image adjustment processing on a sheet on the basis of the size (size A) of the sheet determined by the image reader 20 (step S40). At this time, if the print job instructed includes a job that uses a different type of sheet, the image adjustment processing of step S40 is performed for each feed tray storing the different type of sheet.

After performing the image adjustment processing of step S40 for all types of sheets included in the print job, the controller 100 causes the printer unit 150 to execute the print job (step S41).

Figure 11:
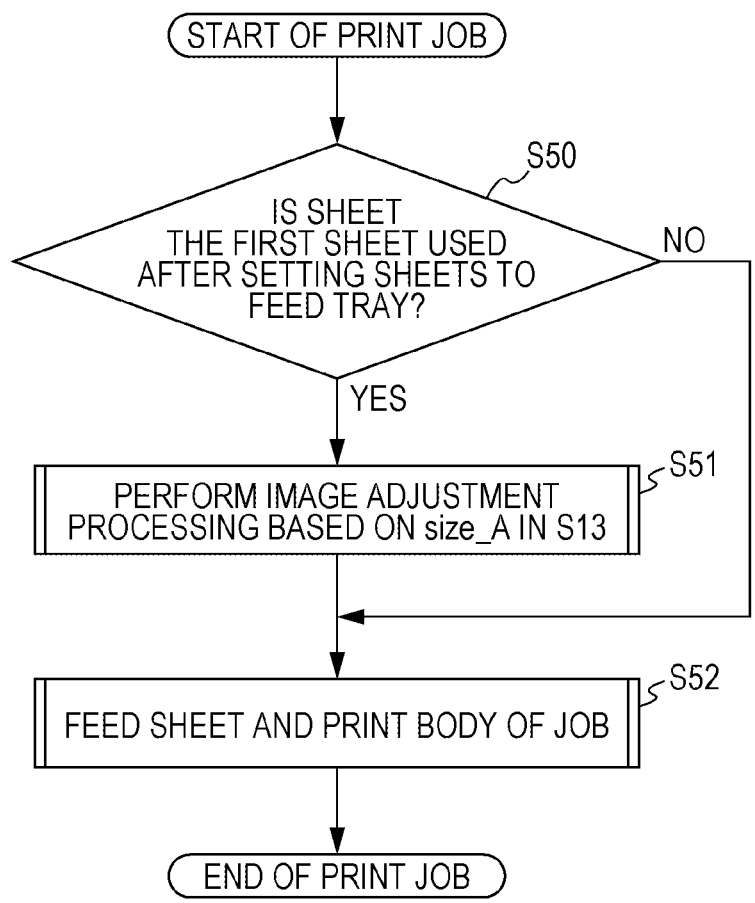
FIG. 11 is a flowchart when the print processing is performed by the image forming apparatus according to an embodiment of the present disclosure.

FIG. 11 is a flowchart when the print processing is performed by the image forming apparatus 1 according to the embodiment of the present disclosure.

First, when a start of a print job is instructed, the controller 100 determines whether or not a sheet used for the print job is a sheet used first among the sheets set in the feed tray (step S50).

If it is determined that the sheet used for the print job is the sheet used first among the sheets set in the feed tray (YES in step S50), the image adjustment controller 40 performs image adjustment processing on the sheet on the basis of the size (size A) of the sheet determined by the image reader 20 (step S51). After the image adjustment processing is performed in step S51, the printer unit 150 performs printing for the number of sheets included in the body of the print job (step S52).

If it is determined that the sheet used for the print job is not the sheet used first among the sheets set in the feed tray (NO in step S50), the image adjustment processing for the sheet to be subjected to printing is done so that, in step S52, the print processing for the number of sheets included in the body of the print job is performed.

According to the embodiment of the present disclosure, when a sheet is newly set in the feed tray, the image adjustment processing is performed for the sheet so that the quality of print can be maintained.

Although the image forming apparatus 1 according to the embodiment of the present disclosure has been described above, the present disclosure is not limited to the above embodiment but can be modified in various ways without departing from the scope of the disclosure described in the claims.

In the embodiment of the present disclosure, the sheet broadly includes not only a recording medium produced using pulp as the main raw material but also a recording medium on which an image can be formed by the image forming apparatus.

Note that the image reading device including the image reader 20 of the embodiment of the present disclosure is referred to as an image calibration control unit (ICCU) in some cases but is not limited to the ICCU.

Although embodiments of the present disclosure have been described and illustrated in detail, the disclosed embodiments are made for purposes of illustration and example only and not limitation. The scope of the present disclosure should be interpreted by terms of the appended claims.

As used herein, the words "can" and "may" are used in a permissive (i.e., meaning having the potential to), rather than mandatory sense (i.e., meaning must). The words "include," "includes," "including," and the like mean including, but not limited to. Similarly, the singular form of "a" and "the" include plural references unless the context clearly dictates otherwise. And the term "number" shall mean one or an integer greater than one (i.e., a plurality).

What is claimed is:

1. An image forming apparatus, comprising:
    a sheet storage that stores a sheet;

a first sheet sensor that determines a sheet size of the sheet stored in the sheet storage;
a feeder that feeds the sheet from the sheet storage to a transport path by an amount determined based on the sheet size;
an image former that forms an image on the sheet fed to the transport path;
a second sheet sensor that (i) is provided downstream of the image former on the transport path, (ii) reads the sheet in the transport path, and (iii) confirms or adjusts the sheet size of the sheet; and
a hardware processor that performs adjustment of image formation on the sheet based on the adjusted sheet size,
wherein the second sheet sensor reads a sheet size larger than a sheet size determined by the first sheet sensor.

2. The image forming apparatus according to claim 1, wherein a read area of the second sheet sensor corresponds to a range obtained by adding a predetermined area to a width of the sheet transported at minimum.

3. The image forming apparatus according to claim 1, wherein a read area of the second sheet sensor is larger than a read area of the first sheet sensor.

4. The image forming apparatus according to claim 2, wherein the predetermined area of the read area of the second sheet sensor can be arbitrarily set by a user.

5. The image forming apparatus according to claim 1, wherein the second sheet sensor reads an adjustment image formed by the image former on the sheet fed from the feeder, calculates a distance value between an edge of the sheet and the adjustment image, and calculates an image adjustment value necessary for image adjustment by comparing the distance value with a predetermined ideal distance value.

6. The image forming apparatus according to claim 5, wherein the second sheet sensor changes the ideal distance value based on a difference between the sheet size determined by the first sheet sensor and the adjusted sheet size.

7. The image forming apparatus according to claim 6, wherein the second sheet sensor reads the adjustment image formed by the image former on the sheet fed from the feeder, calculates the distance value between the edge of the sheet and the adjustment image, and calculates the image adjustment value necessary for image adjustment by comparing the distance value with the changed ideal distance value.

8. The image forming apparatus according to claim 5, further comprising:
an operation part that inputs an instruction on whether or not to form the adjustment image.

9. The image forming apparatus according to claim 1, wherein the first sheet sensor determines the sheet size of the sheet based on dimensions of the sheet storage.

10. The image forming apparatus according to claim 1, wherein the first sheet sensor determines the sheet size of the sheet based on a value specified by a user.

11. The image forming apparatus according to claim 1, wherein the second sheet sensor determines the sheet size of the sheet by reading a length of the sheet in main and sub directions of the sheet using a line sensor.

12. The image forming apparatus according to claim 1, further comprising:
a storage that stores the sheet size determined by the second sheet sensor, the storage storing each of a size on a front side and a size on a back side of the sheet.

13. The image forming apparatus according to claim 12, further comprising:
a sheet storage that is provided downstream of the image former on the transport path and stores a sheet used to determine the size on the front side of the sheet.

14. An image forming method, comprising:
determining a sheet size of a sheet stored in a sheet storage by a first sheet sensor included in an image forming apparatus;
feeding a first sheet from the sheet storage to a transport path by a feeder included in the image forming apparatus, an amount of the feeding being determined based on the sheet size;
reading the first sheet fed to the transport path and confirming or adjusting the sheet size of the sheet using a second sheet sensor included in the image forming apparatus; and
performing adjustment of image formation on the sheet by a hardware processor included in the image forming apparatus based on the confirmed or adjusted sheet size,
wherein the second sheet sensor reads a sheet size larger than a sheet size determined by the first sheet sensor.

15. An image forming method, comprising:
determining a sheet size of a sheet stored in a sheet storage by a first sheet sensor included in an image forming apparatus;
feeding a first sheet from the sheet storage to a transport path by a feeder included in the image forming apparatus, an amount of the feeding being determined based on the sheet size;
reading the first sheet fed to the transport path and confirming or adjusting the sheet size of the sheet using a second sheet sensor included in the image forming apparatus;
feeding a second sheet following the first sheet to the transport path by the feeder;
forming an adjustment image on the second sheet in the transport path by an image former included in the image forming apparatus; and
calculating a distance value between an edge of the sheet and the adjustment image based on the confirmed or adjusted sheet size, calculating an image adjustment value by comparing the distance value with a predetermined ideal distance value, and performing adjustment of image formation on the sheet by a hardware processor included in the image forming apparatus based on the image adjustment value.

16. The image forming method according to claim 15, further comprising:
the second sheet sensor included in the image forming apparatus reading the sheet fed to the transport path for each type of sheet included in a print job that is executed by the image forming apparatus, and performing processing that confirms or adjusts the sheet size of the sheet.

17. An image forming method, comprising:
determining a sheet size of a sheet stored in a sheet storage by a first sheet sensor included in an image forming apparatus;
feeding the sheet from the sheet storage to a transport path by a feeder included in the image forming apparatus, an amount of the feeding being determined based on the sheet size;
forming an adjustment image on the sheet in the transport path by an image former included in the image forming apparatus;
reading the sheet fed to the transport path and confirming or adjusting the sheet size of the sheet using a second sheet sensor included in the image forming apparatus;

calculating a difference between the sheet size determined by the first sheet sensor and the adjusted sheet size, and changing an ideal distance value according to the difference; and calculating a distance value between an edge of the sheet and the adjustment image based on the sheet size determined by the first sheet sensor, calculating an image adjustment value by comparing the distance value with the changed ideal distance value, and performing adjustment of image formation on the sheet based on the image adjustment value.

18. The image forming method according to claim 17, further comprising:

the second sheet sensor included in the image forming apparatus reading the sheet fed to the transport path when a sheet used in a print job is determined to be a sheet set in the sheet storage with no image adjustment processing performed on the sheet, and performing processing that adjusts the sheet size of the sheet.

19. The image forming method according to claim 17, further comprising:

the second sheet sensor included in the image forming apparatus reading the sheet fed to the transport path for each type of sheet included in a print job that is executed by the image forming apparatus, and performing processing that confirms or adjusts the sheet size of the sheet.

20. A non-transitory recording medium storing a computer readable program that causes a computer to execute:

determining a sheet size of a sheet stored in a sheet storage by a first sheet sensor included in an image forming apparatus;

feeding a first sheet from the sheet storage to a transport path by a feeder included in the image forming apparatus, an amount of the feeding being determined based on the sheet size;

reading the first sheet fed to the transport path and confirming or adjusting the sheet size of the sheet using a second sheet sensor included in the image forming apparatus; and performing adjustment of image formation on the sheet by a hardware processor included in the image forming apparatus based on the confirmed or adjusted sheet size, wherein the second sheet sensor reads is capable of reading a sheet size larger than a sheet size determined by the first sheet sensor.

* * * * *